SEMICONDUCTIVE ELECTROLUMINESCENT DEVICES

Filed Oct. 11, 1962

Inventor
DAVID ERIC MASON
By
Cameron, Kerkam & Sutton
Attorneys 3,207,939

SEMICONDUCTIVE ELECTROLUMINESCENT DEVICES

David Eric Mason, Wilmslow, England, assignor to Ferranti Limited, Hollinwood, Lancashire, England, a company of Great Britain Filed Oct. 11, 1962, Ser. No. 229,964
Claims priority, application Great Britain, Oct. 20, 1961, 37,639/61
10 Claims. (Cl. 313—108)

This invention relates to electroluminescent devices.

Known electroluminescent devices comprises a layer of electroluminescent material between two metal electrodes, at least one of which is transparent. Such devices are caused to luminesce by the application of an A.C. voltage, usually in excess of 100 volts, to the two electrodes.

It is an object of the present invention to provide electroluminescent devices which may be operated by direct current (D.C.) and at substantially lower voltages than previously known electroluminescent devices.

According to the present invention an electroluminescent device comprises a single crystal layer of an electroluminescent material grown on a single crystal substrate of a P-type semiconductor material having substantially the same crystal structure as said electroluminescent material, and a substantially optically transparent layer of metal deposited on the free face of said layer of electroluminescent material.

Said P-type semiconductor material substrate may be formed on a layer of N-type semiconductor material.

Said semiconductor material may be silicon and said electroluminescent material may be activated zinc sulphide.

Figure 1:
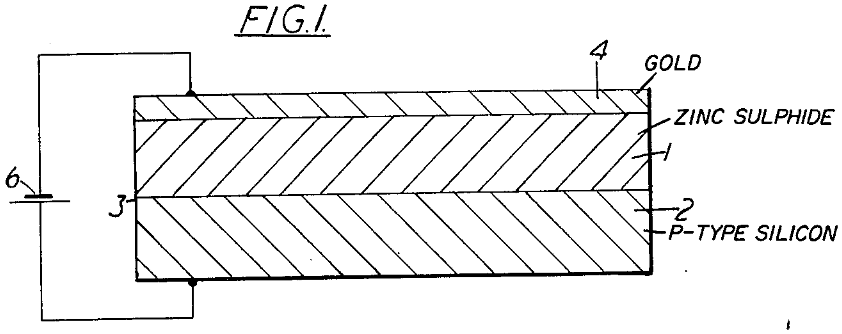
Figure 3:
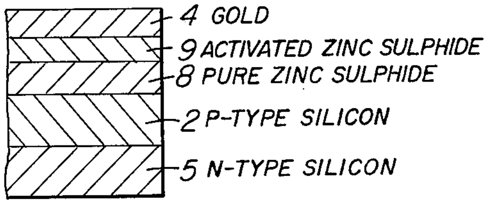
Figure 2:
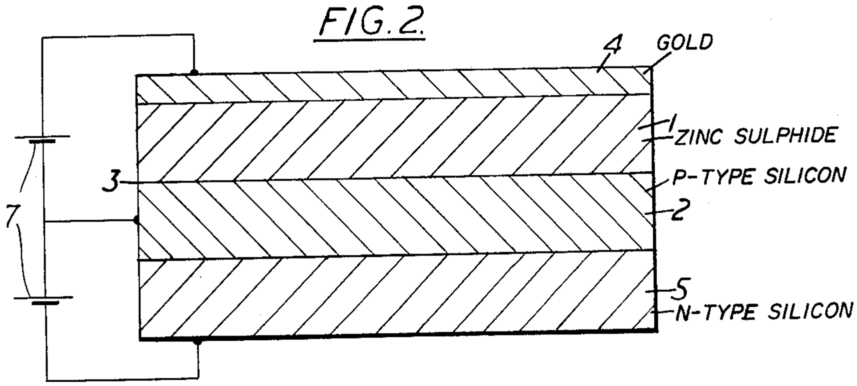

The present invention will now be described by way of example with reference to the accompanying drawings in which:

FIGURE 1 is a schematic sectional elevation of one form of electroluminescent device in accordance with the invention, FIGURE 2 is a schematic sectional elevation of a further form of electroluminescent device in accordance with the invention, and FIGURE 3 is a fragmentary sectional elevation of a further form of electroluminescent device in accordance with the invention.

Referring now to FIGURE 1 of the drawings, the electroluminescent device shown comprises a single crystal layer 1 of zinc sulphide activated with copper and chlorine grown on a single crystal substrate 2 of P-type silicon. The crystal 1 of activated zinc sulphide is grown in such manner that the junction 3 between the activated zinc sulphide 1 and the P-type silicon 2 is formed as a heterojunction, i.e. the crystal structure across the junction remains perfect, this being possible due to the substantial similarity between the crystal structures of silicon and zinc sulphide. The free face of the layer 1 of zinc sulphide is coated with a substantially optically transparent layer 4 of gold.

In operation the device shown in FIGURE 1 is connected in a circuit to a suitable voltage source 6 as a PIN semiconductor diode, the layer 4 of gold acting as an N-type layer. The application of a D.C. potential of between 2 and 4 volts in the appropriate direction causes current to flow, and this current causes luminescence in the activated zinc sulphide crystal layer 1 which is visible through the layer 4 of gold.

Due to the low D.C. potential required to operate devices of the kind shown in FIGURE 1 they are very suitable for use as visible indicators in transistor circuits.

The electroluminescent device shown in FIGURE 2 is similar to that shown in FIGURE 1 but in this example the single crystal substrate 2 of P-type silicon is formed on a layer 5 of N-type silicon and the zinc sulphide is activated with manganese.

In operation the device shown in FIGURE 2 is connected in a circuit to a suitable voltage source 7 as in NPIN transistor, the layer 5 of N-type silicon acting as the emitter, the layer 2 of P-type silicon acting as the base and the layer 4 of gold acting as the collector. The N–P junction between the layers 5 and 2 acts as a source of electrons which are injected into the layer 1 of activated zinc sulphide and accelerated to excite the luminescence centres to cause a light output visible through the layer 4 of gold. The electrons are collected by the layer 4 of gold. The number of electrons injected into the layer 1 of activated zinc sulphide may be controlled by the potential applied to the base, i.e. the layer 2 of P-type silicon, and the acceleration of the electrons may be controlled by the potential applied to the collector, i.e. the layer 4 of gold.

The devices described above may be modified in many ways. In the device shown in FIGURE 2, for example, the electrons are not able to excite the luminescence centres until they have acquired a certain energy. The single crystal layer of zinc sulphide may therefore be formed, as illustrated in FIG. 3, as a first single crystal layer 8 of pure zinc sulphide grown on the layer 2 of P-type silicon and a second single crystal layer 9 of activated zinc sulphide grown on the first layer of pure zinc sulphide. The electrons may then be accelerated through the first layer of pure zinc sulphide such that they have sufficient energy to cause excitation of the luminescence centres when they reach the second layer of activated zinc sulphide.

In both of the examples described above electroluminescent materials and semiconductor materials other than zinc sulphide and silicon may be used provided the crystal structure of the electroluminescent material and the semiconductor material are substantially the same. For example, germanium may also be used with zinc sulphide. It is also preferable that the coefficients of expansion of the electroluminescent material and the semiconductor material should be similar so that no substantial strains are caused during manufacture of the device when it is cooled from an elevated temperature.

What we claim is:

1. An electroluminescent device comprising a single crystal layer of an electroluminescent material on a single crystal substrate of a P-type semiconductor material having substantially the same crystal structure as said electroluminescent material, the junction between said single crystal layer and said single crystal substrate being a heterojunction, a layer of N-type semiconductor material on which said P-type semiconductor material substrate is located, and a substantially optically transparent layer of metal deposited on the free face of said layer of eleectroluminescent material.

2. An electroluminescent device as claimed in claim 1 wherein said layer of electroluminescent material comprises a single crystal layer of non-activated electroluminescent material on said single crystal substrate and a single crystal layer of activated electroluminescent material on said layer of non-activated electroluminescent material.

3. An electroluminescent device as claimed in claim 1 in which said semiconductor material and said electroluminescent material have similar coefficients of expansion.

4. An electroluminescent device as claimed in claim 1 in which said semiconductor material is silicon and said electroluminescent material is activated zinc sulphide.

5. An electroluminescent device comprising a single crystal layer of an electroluminescent material, a single crystal substrate of a P-type semiconductor material having substantially the same crystal structure as said electroluminescent material, the junction between said single crystal layer and said single crystal substrate being a heterojunction, a layer of N-type semiconductor material on the free face of said P-type semiconductor material substrate, and a substantially optically transparent layer of metal on the free face of said layer of electroluminescent material.

6. An electroluminescent device as set forth in claim 5 wherein said layer of electroluminescent material comprises a single crystal layer of non-activated electroluminescent material and a single crystal layer of activated electroluminescent material, said layer of non-activated material being formed on said single crystal substrate and said layer of activated material being formed on said layer of non-activated material, the junction between said layer of non-activated material and said layer of activated material being a heterojunction.

7. An electroluminescent device as set forth in claim 5 wherein said semiconductor material and said electroluminescent material have similar coefficients of expansion.

8. An electroluminescent device as set forth in claim 5 wherein said semiconductor material is silicon and said electroluminescent material is activated zinc sulphide.

9. An electroluminescent device comprising a single crystal layer of an electroluminescent material of pure zinc sulphide, a single crystal substrate of a P-type semiconductor material having substantially the same crystal structure as said electroluminescent material, the junction between said single crystal layer and said single crystal substrate being a heterojunction, a single crystal layer of activated zinc sulphide on the free face of said first layer of pure zinc sulphide, a layer of N-type semiconductor material on the free face of said P-type semiconductor material substrate, and a substantially optically transparent layer of metal deposited on the free face of said layer of activated zinc sulphide.

10. An electroluminescent device adapted to be energized from a D.C. source comprising a single crystal layer of electroluminescent material, a single crystal substrate of a P-type semiconductive material having substantially the same crystal structure as said electroluminescent material, the junction between said single crystal layer and said crystal substrate being a heterojunction, a substantially optical transparent layer of metal deposited on the free face of said layer of electroluminescent material, a single crystal layer of an N-type semiconductor material adjacent the free face of said P-type material, and means for connecting said P-type single crystal substrate and the free faces of said metal layer and said N-type material to a source of D.C. potential for energization of the device.

References Cited by the Examiner

UNITED STATES PATENTS

| | | | |
|---|---|---|---|
| 2,683,794 | 7/54 | Briggs et al. | 317—234 |
| 2,735,049 | 2/56 | De Forest | 313—108.1 |

OTHER REFERENCES

Fischer: Injection Electroluminescence, "Solid State Electronics," vol. 2, pp. 232–246 (1961), Pergamon Press, June 14, 1961.

GEORGE N. WESTBY, *Primary Examiner.*